United States Patent
Nakano et al.

(10) Patent No.: US 11,178,333 B2
(45) Date of Patent: Nov. 16, 2021

(54) VIBRATION MEASUREMENT SYSTEM, VIBRATION MEASUREMENT APPARATUS, VIBRATION MEASUREMENT METHOD, AND COMPUTER-READABLE RECORDING MEDIUM

(71) Applicant: NEC Corporation, Tokyo (JP)

(72) Inventors: Gaku Nakano, Tokyo (JP); Kazuhito Murata, Tokyo (JP); Asuka Ishii, Tokyo (JP); Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,092

(22) PCT Filed: Mar. 29, 2018

(86) PCT No.: PCT/JP2018/013507
§ 371 (c)(1),
(2) Date: Sep. 24, 2020

(87) PCT Pub. No.: WO2019/186985
PCT Pub. Date: Oct. 3, 2019

(65) Prior Publication Data
US 2021/0029297 A1  Jan. 28, 2021

(51) Int. Cl.
*H04N 5/232* (2006.01)
*G01C 19/06* (2006.01)
*G01H 1/10* (2006.01)

(52) U.S. Cl.
CPC ....... *H04N 5/23293* (2013.01); *G01C 19/065* (2013.01); *G01H 1/10* (2013.01)

(58) Field of Classification Search
CPC ........... G01C 19/065; G01H 1/10; G01H 9/00
See application file for complete search history.

(56) References Cited

U.S. PATENT DOCUMENTS 9,310,341 B2* 4/2016 Park .................. G01N 29/2418
10,127,678 B2* 11/2018 Acai ...................... G01B 11/16
(Continued)

FOREIGN PATENT DOCUMENTS

JP  2003-156389 A  5/2003
JP  2005-283440 A  10/2005
(Continued)

OTHER PUBLICATIONS

International Search Report for PCT Application No. PCT/JP2018/013507, dated Jun. 12, 2018.
(Continued)

*Primary Examiner* — Boubacar Abdou Tchoussou
(74) *Attorney, Agent, or Firm* — Sughrue Mion, PLLC

(57) ABSTRACT

A vibration measurement system comprises an image capturing apparatus, a distance measuring apparatus, a sensor that outputs a signal according to an inclination of the image capturing apparatus relative to the vertical direction, and a vibration measurement apparatus. The vibration measurement apparatus includes calculating an angle formed by the normal of an image capturing surface of the image capturing apparatus and the normal of the measurement target surface that the image capturing apparatus shoots, based on the signal output by the sensor, converting the image obtained that the image capturing apparatus shoots into an image that would be obtained were the normal of the measurement target surface coincident with the normal of the image capturing surface of the image capturing apparatus, using the calculated angle, and measuring vibration of the structure, using the converted image and the measured distance from the image capturing apparatus to the measurement target surface.

12 Claims, 6 Drawing Sheets

(56) References Cited

U.S. PATENT DOCUMENTS

| | | | |
|---|---|---|---|
| 10,240,971 B2* | 3/2019 | Wakita | G01H 9/00 |
| 10,323,978 B2* | 6/2019 | Wakita | G01H 9/00 |
| 10,718,659 B2* | 7/2020 | Nohmi | G01H 9/00 |
| 2013/0312529 A1* | 11/2013 | Park | G01H 9/00 73/657 |
| 2016/0171309 A1* | 6/2016 | Hay | A61B 5/024 348/143 |
| 2017/0169575 A1* | 6/2017 | Acal | G01H 9/00 |
| 2017/0299427 A1* | 10/2017 | Nohmi | G01S 7/06 |
| 2017/0322072 A1* | 11/2017 | Wakita | G01M 7/025 |
| 2017/0356792 A1* | 12/2017 | Wakita | G01H 9/00 |
| 2018/0058882 A1 | 3/2018 | Hodohara et al. | |
| 2021/0041220 A1* | 2/2021 | Weeren | G01B 11/161 |

FOREIGN PATENT DOCUMENTS

| | | | |
|---|---|---|---|
| JP | 2007263611 A | 10/2007 |
| JP | 2016-024052 A | 2/2016 |
| JP | 2016-197074 A | 11/2016 |
| JP | 2017-142185 A | 8/2017 |
| JP | 2018-036189 A | 3/2018 |
| WO | 99/54678 A1 | 10/1999 |

OTHER PUBLICATIONS

English translation of Written opinion for PCT Application No. PCT/JP2018/013507, dated Jun. 12, 2018.

* cited by examiner

VIBRATION MEASUREMENT SYSTEM, VIBRATION MEASUREMENT APPARATUS, VIBRATION MEASUREMENT METHOD, AND COMPUTER-READABLE RECORDING MEDIUM

This application is a National Stage Entry of PCT/JP2018/013507 filed on Mar. 29, 2018, the contents of all of which are incorporated herein by reference, in their entirety.

TECHNICAL FIELD

The present invention relates to a vibration measurement system, a vibration measurement apparatus and a vibration measurement method that are for measuring vibration of structures such as infrastructure elements using image processing, and further relates to a computer-readable recording medium that includes a program recorded thereon for realizing the system, apparatus and method.

BACKGROUND ART

Heretofore, technologies for contactlessly measuring mechanical vibration of an object from a remote location have been proposed. According to such technologies, attachment and removal of sensors for vibration detection is no longer necessary and efficient vibration measurement becomes possible, and thus there is demand particularly in fields such as maintenance management and anomaly detection of infrastructure elements such as bridges, roads, buildings and facilities.

For example, Patent Document 1 discloses a vibration measurement apparatus that uses an image capturing apparatus. The vibration measurement apparatus disclosed in Patent Document 1 acquires time-series images of an object from the image capturing apparatus, and performs image processing on the acquired time-series images to measure vibration of the object.

Patent Document 2 discloses a vibration measurement apparatus that is also provided with a distance measurement apparatus such as a laser range finder or an ultrasonic range finder, in addition to an image capturing apparatus. According to the vibration measurement apparatus disclosed in Patent Document 2, the vibration component in the optical axis direction of the image capturing apparatus can also be measured by the distance measurement apparatus, in addition to the vibration component in two-dimensional directions within an image, thus enabling vibration of an object to be measured in three-dimensional directions.

Incidentally, in order to enhance the accuracy of vibration measurement with the vibration measurement apparatus disclosed in Patent Documents 1 and 2, the image capturing apparatus and the image capturing target surface need to be arranged directly facing each other, with the image capturing surface of the image capturing apparatus parallel to the image capturing target surface. However, given that the image capturing apparatus is usually installed manually, and that, furthermore, the place where the infrastructure element to be measured is installed is not necessarily flat, it is very difficult for an operator to accurately arrange the image capturing surface of the image capturing apparatus and the image capturing target surface directly facing each other.

In response to this, Patent Document 3, for example, proposes a technique for accurately measuring the vibration of an object, without arranging the image capturing apparatus and the measurement target surface directly facing each other. Specifically, with the technique disclosed in Patent Document 3, a plurality of markers provided with a repetitive pattern that changes in the vertical direction are attached in advance to a lateral surface or the like of the infrastructure element to be measured. Subsequently, the amount of change in the repetitive pattern of each marker is calculated from shot moving image data, and, furthermore, a correction amount for vibration of the object is calculated from the calculated amount of change of each marker. According to the technique disclosed in Patent Document 3, it is conceivable for the accuracy of vibration measurement to be enhanced, even in the case where the image capturing surface of the image capturing apparatus and the image capturing target surface are not parallel.

LIST OF RELATED ART DOCUMENTS

Patent Document

Patent Document 1: Japanese Patent Laid-Open Publication No. 2003-156389
Patent Document 2: Japanese Patent Laid-Open Publication No. 2005-283440
Patent Document 3: Japanese Patent Laid-Open Publication No. 2017-142185

SUMMARY OF INVENTION

Problems to be Solved by the Invention

However, in order to implement the technique disclosed in Patent Document 3, a plurality of markers need to be attached to the infrastructure element serving as the object. Given that the markers need to be attached manually, and that, furthermore, there are risks involved in installation, considerable human costs, time costs and monetary costs will be incurred in implementing the technique disclosed in Patent Document 3.

An example object of the invention is to provide a vibration measurement system, a vibration measurement apparatus, a vibration measurement method and a computer-readable recording medium that solve the above problems and can execute highly accurate vibration measurement without requiring manual operations.

Means for Solving the Problems

A vibration measurement system according to an example aspect of the invention is a system for measuring vibration of a structure, including:

an image capturing apparatus that shoots a measurement target surface of the structure;

a distance measuring apparatus that measures a distance from the image capturing apparatus to the measurement target surface;

a sensor that outputs a signal according to an inclination of the image capturing apparatus relative to a vertical direction; and a vibration measurement apparatus, the vibration measurement apparatus including:

an angle calculation unit configured to calculate an angle formed by a normal of an image capturing surface of the image capturing apparatus and a normal of the measurement target surface, based on the signal output by the sensor;

an image conversion unit configured to convert the image obtained due to shooting by the image capturing apparatus into an image that would be obtained were the normal of the measurement target surface coincident with the normal of the image capturing surface of the image capturing apparatus, using the calculated angle; and a vibration measurement unit configured to measure vibration of the structure, using the converted image and the measured distance.

Also, a vibration measurement apparatus according to an example aspect of the invention is an apparatus for measuring vibration of a structure, including:

an angle calculation unit configured to calculate an angle formed by a normal of an image capturing surface of an image capturing apparatus that shoots a measurement target surface of the structure and a normal of the measurement target surface, based on a signal output by a sensor according to an inclination of the image capturing apparatus relative to a vertical direction;

an image conversion unit configured to convert the image obtained due to shooting by the image capturing apparatus into an image that would be obtained were the normal of the measurement target surface coincident with the normal of the image capturing surface of the image capturing apparatus, using the calculated angle; and a vibration measurement unit configured to measure vibration of the structure, using the converted image and a distance from the image capturing apparatus to the measurement target surface measured by a distance measuring apparatus.

Also, a vibration measurement method according to an example aspect of the invention is a method for measuring vibration of a structure, including:

(a) a step of shooting a measurement target surface of the structure with an image capturing apparatus;

(b) a step of measuring a distance from the image capturing apparatus to the measurement target surface with a distance measuring apparatus;

(c) a step of outputting a signal with a sensor according to an inclination of the image capturing apparatus relative to a vertical direction;

(d) a step of calculating an angle formed by a normal of an image capturing surface of the image capturing apparatus and a normal of the measurement target surface, based on the signal output by the sensor;

(e) a step of converting the image obtained due to shooting by the image capturing apparatus into an image that would be obtained were the normal of the measurement target surface coincident with the normal of the image capturing surface of the image capturing apparatus, using the calculated angle; and (f) a step of measuring vibration of the structure, using the converted image and the measured distance.

Furthermore, a computer-readable recording medium according to an example aspect of the invention includes a program recorded thereon for measuring vibration of a structure with a computer, the program including instructions that cause the computer to carry out:

(a) a step of calculating an angle formed by a normal of an image capturing surface of an image capturing apparatus that shoots a measurement target surface of the structure and a normal of the measurement target surface, based on a signal output by a sensor according to an inclination of the image capturing apparatus relative to a vertical direction;

(b) a step of converting the image obtained due to shooting by the image capturing apparatus into an image that would be obtained were the normal of the measurement target surface coincident with the normal of the image capturing surface of the image capturing apparatus, using the calculated angle; and (c) a step of measuring vibration of the structure, using the converted image and a distance from the image capturing apparatus to the measurement target surface measured by a distance measuring apparatus.

Advantageous Effects of the Invention

As described above, according to the invention, highly accurate vibration measurement can be executed without requiring manual operations.

EXAMPLE EMBODIMENTS

Example Embodiment

Hereinafter, a vibration measurement system, a vibration measurement apparatus, a vibration measurement method and a program in an example embodiment of the invention will be described with reference to FIGS. 1 to 6.

[System Configuration]

Figure 1:
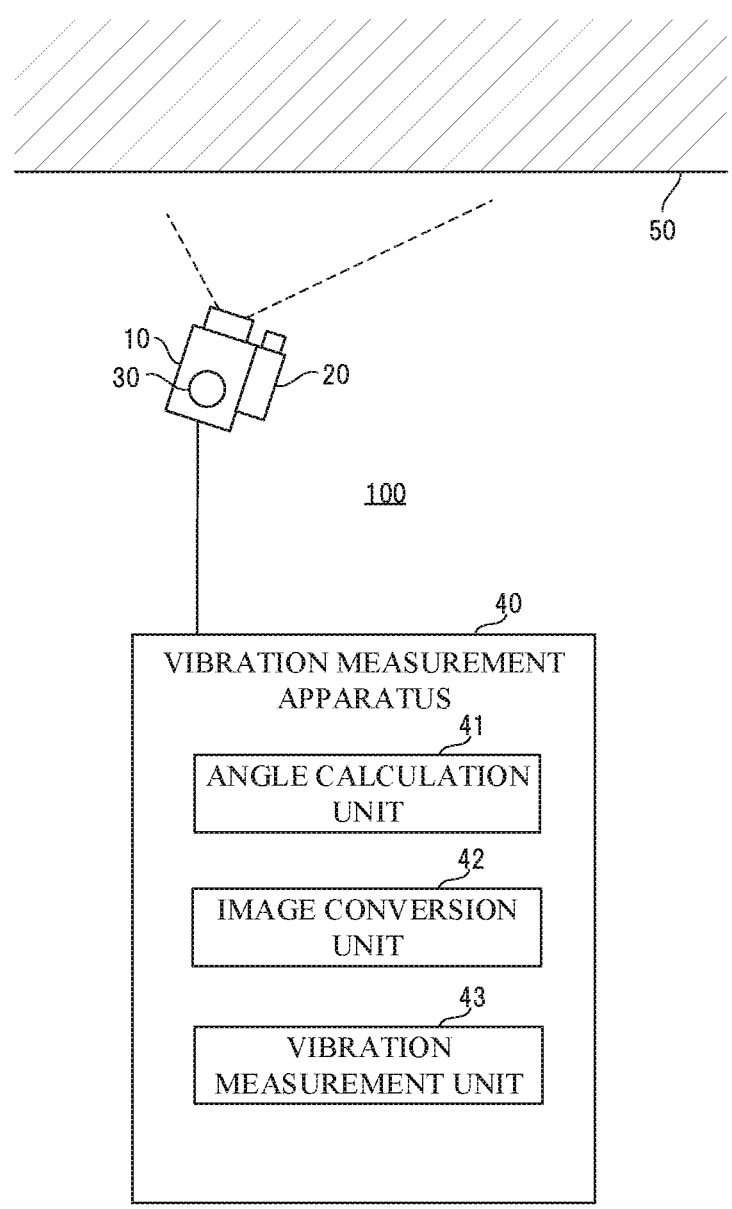
FIG. 1 is a block diagram showing schematic configurations of a vibration measurement system and a vibration measurement apparatus in an example embodiment of the invention.

Initially, schematic configurations of the vibration measurement system and the vibration measurement apparatus in the example embodiment will be described using FIG. 1. FIG. 1 is a block diagram showing schematic configurations of the vibration measurement system and the vibration measurement apparatus in the example embodiment of the invention.

A vibration measurement system 100 in the example embodiment shown in FIG. 1 is a system for measuring vibration of a structure 50. In the example embodiment, infrastructure elements such as bridges, roads, buildings and facilities, for example, are given as the structure 50.

As shown in FIG. 1, the vibration measurement system 100 is provided with an image capturing apparatus 10, a distance measurement apparatus 20, a sensor 30, and a vibration measurement apparatus 40. The image capturing apparatus 10 is an apparatus for shooting a measurement target surface of the structure 50. The distance measuring apparatus 20 is an apparatus that measures a distance from the image capturing apparatus 10 to the measurement target surface. The sensor 30 is a sensor that outputs a signal according to an inclination of the image capturing apparatus 10 relative to the vertical direction. The vibration measurement apparatus 40 is an apparatus for measuring vibration of the structure 50.

Also, as shown in FIG. 1, the vibration measurement apparatus 40 is provided with an angle calculation unit 41, an image conversion unit 42, and a vibration measurement unit 43.

The angle calculation unit 41 calculates an angle formed by the normal of the image capturing surface of the image capturing apparatus 10 and the normal of the measurement target surface, based on the signal output by the sensor 30. The image conversion unit 42 converts the image obtained due to shooting by the image capturing apparatus 10 into an image that would be obtained were the normal of the measurement target surface coincident with the normal of the image capturing surface of the image capturing apparatus 10, using the angle calculated by the angle calculation unit 41. The vibration measurement unit 43 measures vibration of the structure 50, using the image (hereinafter, "converted image") converted by the image conversion unit 42 and the distance measured by the distance measuring apparatus 20.

In this manner, in the example embodiment, the angle between the normal of the image capturing surface of the image capturing apparatus 10 and the normal of the measurement target surface is calculated using the sensor 30, and the image of the measurement target surface is converted using this angle. Therefore, in the example embodiment, the image capturing apparatus 10 is able to execute highly accurate vibration measurement without requiring manual operations, even in the case of not directly facing the measurement target surface.

Figure 2:
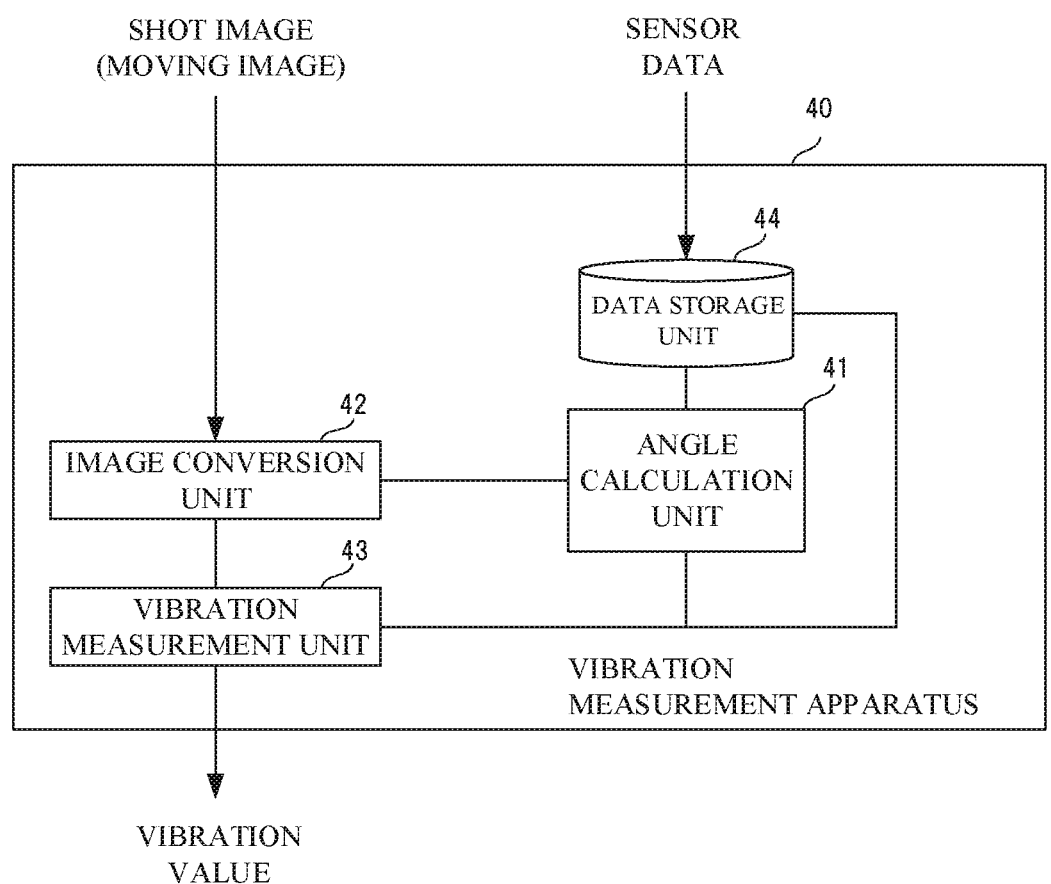
FIG. 2 is a block diagram more specifically showing the configuration of the vibration measurement apparatus in the example embodiment of the invention.
Figure 3:
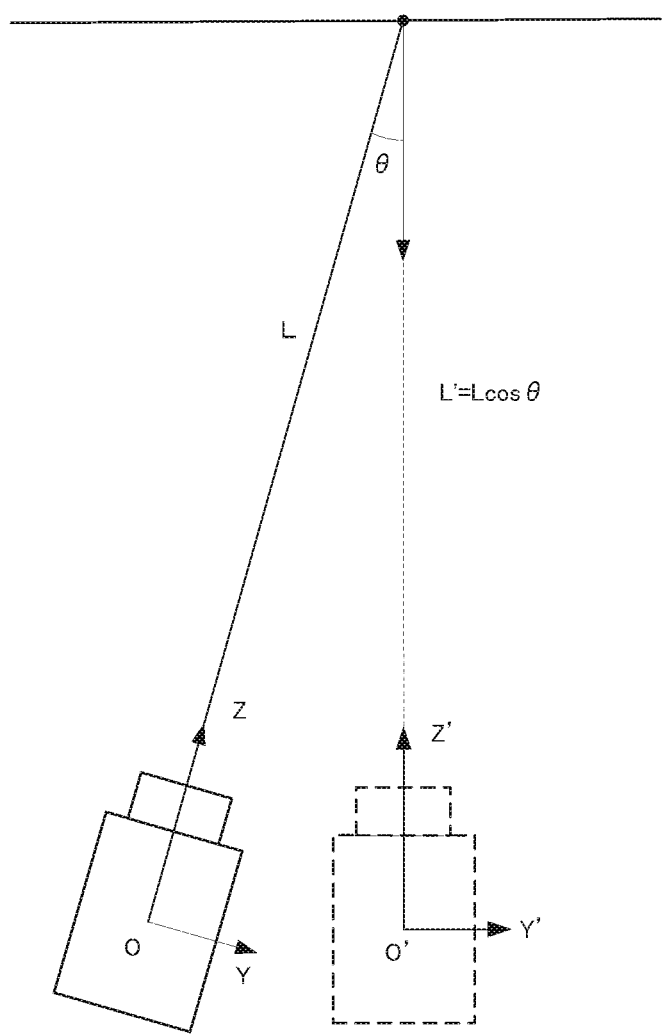
FIG. 3 is a diagram for describing image conversion that is performed in the example embodiment of the invention.

Next, the configurations of the vibration measurement system 100 and the vibration measurement apparatus 40 in the example embodiment will be described more specifically using FIGS. 2 and 3 in addition to FIG. 1. FIG. 2 is a block diagram more specifically showing the configuration of the vibration measurement apparatus in the example embodiment of the invention. FIG. 3 is a diagram for describing image conversion that is performed in the example embodiment of the invention.

First, in the example embodiment, assuming that the structure 50 is a bridge, for example, the measurement target surface is set to a region (deck slab) of the lower surface of the bridge. In this case, the image capturing apparatus 10 and the distance measurement apparatus 20 are installed facing toward the region of the lower surface of the bridge.

In the example embodiment, a digital camera, for example, is used as the image capturing apparatus 10. The image capturing apparatus 10 continuously outputs image data of the measurement target surface every set interval. The image data output by the image capturing apparatus 10 is input to the vibration measurement apparatus 40.

Also, in the example embodiment, a laser range finder, for example, is used as the distance measuring apparatus 20. Also, the distance measuring apparatus 20 measures the distance to the measurement target surface every fixed interval, and outputs data (hereinafter, "distance data") specifying the measured distance every time the distance is measured. The distance data output by the distance measuring apparatus 20 is also input to the vibration measurement apparatus 40.

Furthermore, in the example embodiment, an acceleration sensor, for example, is used as the sensor 30. In this case, the sensor 30 outputs sensor data (hereinafter, "angle data") specifying the inclination angle of the image capturing apparatus 10 relative to the vertical direction. The angle data output by the sensor 30 is also input to the vibration measurement apparatus 40. Also, in the example embodiment, the acceleration sensor is desirably able to detect two or more axes. In this case, the inclination angle of the image capturing surface with the horizontal direction and the inclination angle of the image capturing surface with the vertical direction can be specified from sensor data.

Also, as shown in FIG. 2, in the example embodiment, the vibration measurement apparatus 40 is provided with a data storage unit 44, in addition to the abovementioned angle calculation unit 41, image conversion unit 42 and vibration measurement unit 43. The abovementioned distance data and angle data are stored in the data storage unit 44 when input to the vibration measurement apparatus 40.

The angle calculation unit 41 acquires angle data from the data storage unit 44, and calculates an angle θ formed by the normal of the image capturing surface of the image capturing apparatus 10 and the normal of the measurement target surface from the acquired angle data. For example, assuming that the structure 50 is a bridge, the normal of the measurement target surface will be in the vertical direction. In this case, the angle calculation unit 41 takes the inclination angle that is specified by the angle data as the angle θ.

Here, as shown in FIG. 3, it is assumed that, in the image capturing apparatus 10, a coordinate system whose X-axis direction, Y-axis direction and Z-axis direction are respectively the horizontal direction of the image capturing surface, the vertical direction of the image capturing surface and the normal of the image capturing surface is set. As shown in FIG. 3, it is assumed that a coordinate system whose X'-axis direction, Y'-axis direction and Z'-axis direction are respectively the horizontal direction of the image capturing surface, the vertical direction of the image capturing surface and the normal direction of the image capturing surface is also set for an image capturing apparatus (hereinafter, "virtual image capturing apparatus") that is assumed to have shot the converted image.

In this case, the image conversion unit 42 creates an equation that converts the coordinate system of the image capturing apparatus 10 into the coordinate system of the virtual image capturing apparatus as an equation for image conversion, based on the calculated angle θ (refer to FIG. 3). The image conversion unit 42 then performs image conversion using the created equation for image conversion.

Specifically, the image conversion unit 42 first, calculates a mapping transformation matrix H using the calculated angle θ, and then converts the image shot for vibration measurement, using the calculated mapping transformation matrix H. Also, calculation of the mapping transformation matrix H is performed using the following equations 1 and 2, for example. Furthermore, H or H' described on page 100 of the following reference document can be utilized as the mapping transformation matrix H. Reference document: Gang Xu, "3D CG from Photographs" (in Japanese), Kindai Kagaku Sha, 2001.

Also, in the following equation 1, X is the coordinate at an arbitrary point A on the measurement target surface in the coordinate system of the image capturing apparatus 10. X' is the coordinate of the point A in the coordinate system of an image capturing apparatus (hereinafter, "virtual image capturing apparatus") that is assumed to have shot the converted image. Also, R is a rotation matrix between the image capturing apparatus 10 and the virtual image capturing apparatus, and t is a translation vector. L' is the distance between the virtual image capturing apparatus and the measurement target surface, and L'=L cos θ. n is the normal of the measurement target surface. Note that the virtual image capturing apparatus is shown with dashed lines in FIG. 3.

$$X = RX' + t \quad \text{[Equation 1]}$$

$$H = R + tn^T/L' \quad \text{[Equation 2]}$$

The vibration measurement unit 43, first, calculates the displacement of the measurement target surface in a surface direction from the converted image converted by the image conversion unit 42. Next, the vibration measurement unit 43 calculates the displacement of the measurement target surface in the normal direction from the converted image and the displacement in the surface direction. Thereafter, the vibration measurement unit 43 calculates the vibration of the structure 50 from the displacement in the surface direction and the displacement in the normal direction. Here, processing by the vibration measurement unit 43 will be specifically described below, using the abovementioned coordinate system of the virtual image capturing apparatus. In this coordinate system, the X'-axis direction, Y'-axis direction and Z'-axis direction are respectively the horizontal direction, the vertical direction and the normal direction of the converted image.

Specifically, the vibration measurement unit 43 takes the converted image at an arbitrary time as a reference image, and takes the converted image at other times as a processing image. The vibration measurement unit 43 then, for every processing image, finds a specified region (hereinafter, "specific region") that includes a region of interest on the reference image, that is, a measurement target region within the image, and calculates a displacement (d1$x'$, d1$y'$) in the surface direction.

Also, the vibration measurement unit 43 creates an image group (hereinafter, "reference image group") by enlarging and reducing the reference image by scale factors determined in advance, in order to calculate a displacement d1$z'$ of the specific region in the normal direction. At this time, the vibration measurement unit 43 sets a center position of the enlarged and reduced images of the reference image, based on the displacement (d1$x'$, d1$y'$) in the surface direction previously calculated, and creates the reference image group.

Next, the vibration measurement unit 43, for every processing image, collates the enlarged and reduced images, and specifies the enlarged or reduced image that is most highly collated. Specification of a highly collated image can be performed using a similarity correlation function such as SAD (Sum of Absolute Difference), SSD (Sum of Squared Difference), NCC (Normalized Cross-Correlation) or ZNCC (Zero-mean Normalized Cross-Correlation), for example. The vibration measurement unit 43 then specifies the image with the highest similarity, that is, a highly correlated image, from among the images constituting the reference image group, and calculates the enlargement factor or reduction factor (hereinafter, "scale factor") of the specified image as an amount (d1$z'$) indicating the displacement of the specific region in the normal direction.

Also, in the subsequent description, the displacement that is ultimately obtained with a certain processing image is represented by a displacement (dn$x'$, dn$y'$) and a scale factor (dn$z'$) which is an amount indicating the displacement in the normal direction. The result of similarly calculating displacement for the time-series images can be treated as a value that changes over time, and is thus denoted as a displacement (dn$x'(t)$, dn$y'(t)$) and a scale factor (dn$z'(t)$).

Furthermore, the vibration measurement unit 43 calculates the vibration of the measurement target region on the structure 50 in the surface direction, based on the displacement of the specific region in the surface direction and shooting information of the image capturing apparatus 10. Next, the vibration measurement unit 43 specifies, from distance data, a distance L from the image capturing apparatus 10 to the measurement target surface, and calculates, from this distance L and the angle $\theta$, a distance L' (=L cos $\theta$) from the virtual image capturing apparatus to the measurement target surface. The vibration measurement unit 43 then calculates the vibration of the measurement target surface in the normal direction, based on the displacement of the specific region in the normal direction and the distance L'. In other words, in the example embodiment, the vibration measurement unit 43 corrects the vibration of the measurement target surface in the normal direction, using the measured distance L and the calculated angle $\theta$.

Specifically, the displacement (dn$x'(t)$, dn$y'(t)$) of the specific region in the surface direction is calculated in pixel units. Accordingly, the vibration measurement unit 43, as shown in the following equations 3 and 4, calculates a movement amount ($\Delta x'$, $\Delta y'$) [mm] respectively in the X-direction and Y-direction, using the length per pixel (Dx, Dy) [mm/pixel] of the image sensor of the image capturing apparatus 10 respectively in the X'-direction and Y'-direction. Also, the length per pixel (Dx, Dy) [mm/pixel] of the image sensor can be calculated from the following equations 5 and 6, using a pixel pitch (px, py) [mm] of the image sensor, a focal length f [mm] of the lens, and a distance L' [mm] from the virtual image capturing apparatus to the specific region (measurement target surface).

$$\Delta x' = Dx \cdot dnx(t) \quad \text{[Equation 3]}$$

$$\Delta y' = Dy \cdot dny(t) \quad \text{[Equation 4]}$$

$$Dx = px \cdot (L'/f) \quad \text{[Equation 5]}$$

$$Dy = py \cdot (L'/f) \quad \text{[Equation 6]}$$

Also, the displacement of the specific region in the normal direction is calculated as a scale factor. Accordingly, the vibration measurement unit 43 calculates a movement amount $\Delta z'$ [mm] in the Z' direction (normal direction), using the distance L' [mm] from the virtual image capturing apparatus to the specific region, as shown in the following equation 7.

$$\Delta z' = L' \cdot dnz'(t) \quad \text{[Equation 7]}$$

Also, the movement amount ($\Delta x'$, $\Delta y'$, $\Delta z'$) of the measurement target surface obtained in this way is obtained for every frame of the time-series images that are shot. Therefore, each movement amount obtained for every time-series image represents the measurement target surface whose sampling interval is the reciprocal of the shooting framerate. Each movement amount obtained for every time-series image calculated by the vibration measurement unit 43 can thus be treated as vibration information (vibration waveform) of the measurement target region for each of the X'-direction, Y'-direction and Z'-direction.

[Apparatus Operations]

Next, operations of the vibration measurement system 100 in the example embodiment will be described using FIGS. 4 and 5. In the following description, FIGS. 1 to 3 will be taken into consideration as appropriate. Also, in the example embodiment, the vibration measurement method is implemented by operating the vibration measurement system 100. Therefore, the following description of the operations of the vibration measurement system 100 will be given in place of a description of the vibration measurement method in the example embodiment.

First, angle calculation processing by the vibration measurement apparatus 40 will be described using FIG. 4. FIG. 4 is a flow diagram showing operations at the time of the angle calculation processing by the vibration measurement apparatus in the example embodiment of the invention.

Figure 4:
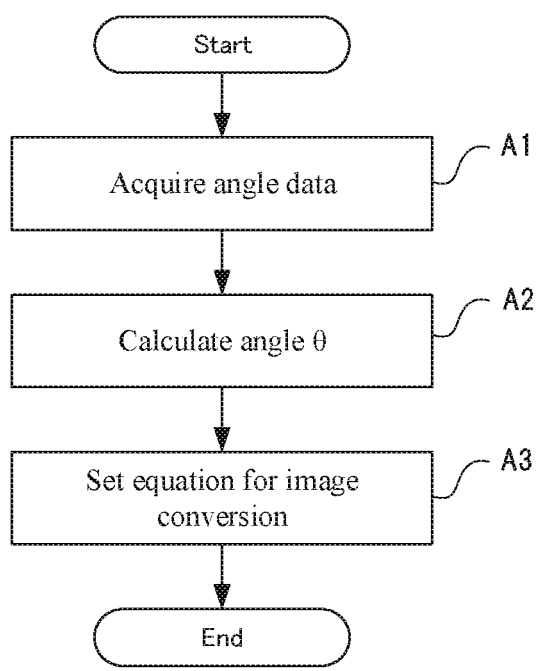
FIG. 4 is a flow diagram showing operations at the time of angle calculation processing by the vibration measurement apparatus in the example embodiment of the invention.

As shown in FIG. 4, initially, the angle calculation unit 41 acquires angle data from the data storage unit 44 (step A1). Note that it is assumed that the angle data is output by the sensor 30 and stored in the data storage unit 44, after installation of the image capturing apparatus 10.

Next, the angle calculation unit 41 calculates the angle θ formed by the normal of the image capturing surface of the image capturing apparatus 10 and the normal of the measurement target surface from the angle data acquired in step A1 (step A2).

Next, the image conversion unit 42 creates an equation for image conversion, based on the angle θ calculated in step A2 (step A3). The angle calculation processing ends with execution of step A3. Steps A1 to A3 are performed before execution of the following steps B1 to B4 shown in FIG. 5.

Next, vibration measurement processing by the vibration measurement apparatus 40 will be described using FIG. 5. FIG. 5 is a flow diagram showing operations at the time of vibration measurement processing by the vibration measurement apparatus in the example embodiment of the invention.

Figure 5:
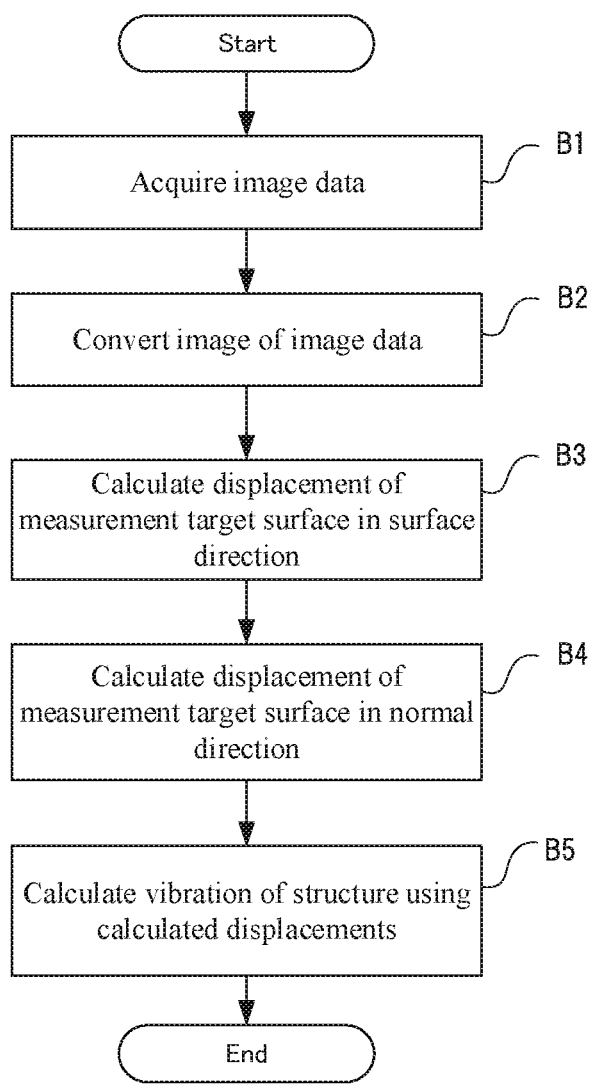
FIG. 5 is a flow diagram showing operations at the time of vibration measurement processing by the vibration measurement apparatus in the example embodiment of the invention.

As shown in FIG. 5, initially, in the vibration measurement apparatus 40, the image conversion unit 42 acquires the image data of the measurement target surface that is output by the image capturing apparatus 10 (step B1).

Next, the image conversion unit 42 converts the image of the image data acquired in step B1 into an image that would be obtained were the normal of the measurement target surface coincident with the normal of the image capturing surface of the image capturing apparatus 10, using the equation for image conversion set in step A3 shown in FIG. 4 (step B2).

Also, steps B1 and B2 are executed during a preset time period or until conversion of a preset number of image data has ended.

Next, the vibration measurement unit 43 calculates the displacement of the measurement target surface in the surface direction from the image (converted image) converted in step B2 (step B3).

Next, the vibration measurement unit 43 calculates the displacement of the measurement target surface in the normal direction from the converted image and the displacement in the surface direction calculated in step B3 (step B4).

Thereafter, the vibration measurement unit 43 calculates the vibration of the structure 50 from the displacement in the surface direction calculated in step B3 and the displacement in the normal direction calculated in step B4 (step B5).

[Effects of the Example Embodiment]

As described above, in the example embodiment, the angle between the image capturing surface of the image capturing apparatus 10 and the measurement target surface is calculated, and the shot image is automatically converted, based on this angle. According to the example embodiment, highly accurate vibration measurement can be executed without requiring manual operations, even in the case where the image capturing apparatus 10 is not arranged directly facing the measurement target surface.

[Program]

A program in the example embodiment need only be a program that causes a computer to execute steps A1 to A3 shown in FIG. 4 and steps B1 to B5 shown in FIG. 5. The vibration measurement apparatus 40 in the example embodiment can be realized by this program being installed on a computer and executed. In this case, a processor of the computer performs processing while functioning as the angle calculation unit 41, the image conversion unit 42, and the vibration measurement unit 43.

Also, a program in the example embodiment may be executed by a computer system built from a plurality of computers. In this case, for example, the computers may each function as one of the angle calculation unit 41, the image conversion unit 42, and the vibration measurement unit 43.

Figure 6:
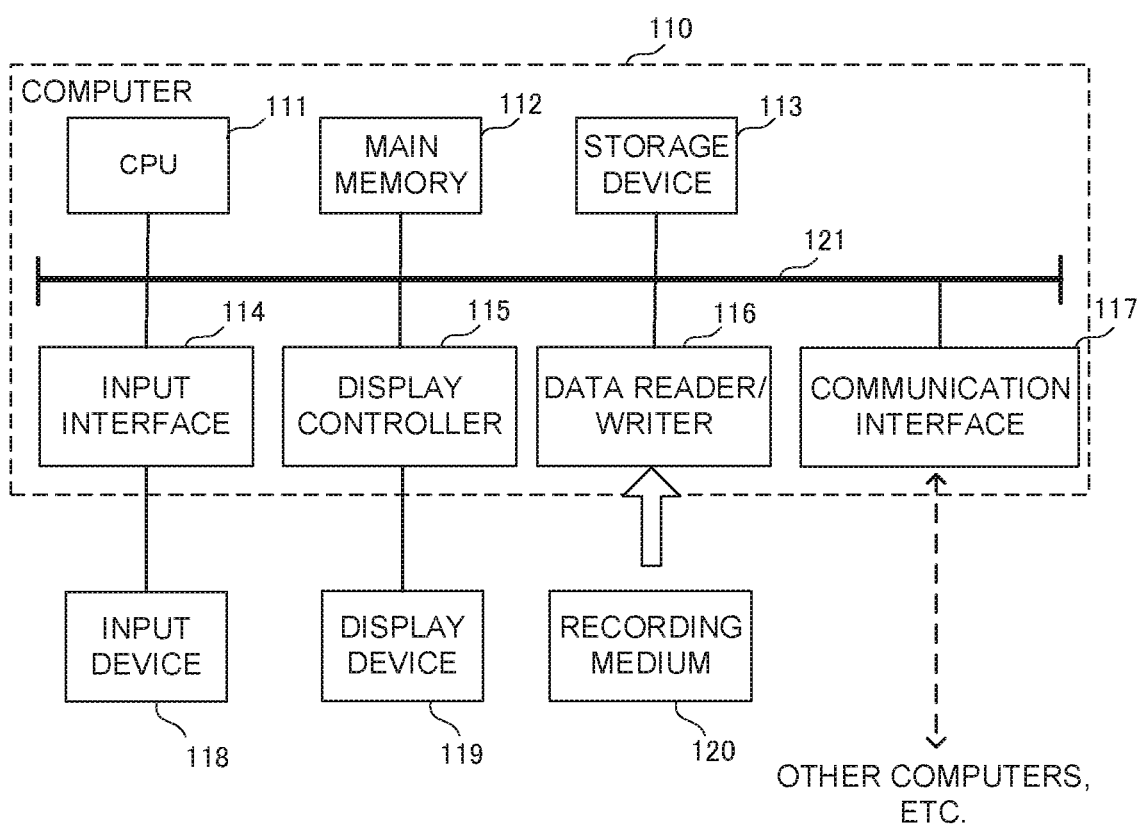
FIG. 6 is a block diagram showing an example of a computer that realizes the vibration measurement apparatus in the example embodiment of the invention.

Here, a computer that realizes the vibration measurement apparatus 40 by executing the program of the example embodiment will be described using FIG. 6. FIG. 6 is a block diagram showing an example of a computer that realizes the vibration measurement apparatus in the example embodiment of the invention.

As shown in FIG. 6, a computer 110 includes a CPU (Central Processing Unit) 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting programs (code) of the example embodiment that are stored in the storage device 113 to the main memory 112, and executing these programs in predetermined order. The main memory 112, typically, is a volatile storage device such as a DRAM (Dynamic Random Access Memory). Also, programs in the example embodiment are provided in a state of being stored in a computer-readable recording medium 120. Note that programs in the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the vibration measurement apparatus 40 in the example embodiment is also realizable by using hardware corresponding to the respective constituent elements, rather than by a computer on which programs are installed. Furthermore, the vibration measurement apparatus 40 may be realized in part by programs, and the remaining portion may be realized by hardware.

The example embodiment described above can be partially or wholly realized by supplementary notes 1 to 12 described below, although the invention is not limited to the following description.

(Supplementary Note 1)

A system for measuring vibration of a structure, including:

an image capturing apparatus that shoots a measurement target surface of the structure;

a distance measuring apparatus that measures a distance from the image capturing apparatus to the measurement target surface;

a sensor that outputs a signal according to an inclination of the image capturing apparatus relative to a vertical direction; and a vibration measurement apparatus, the vibration measurement apparatus including:

an angle calculation unit configured to calculate an angle formed by a normal of an image capturing surface of the image capturing apparatus and a normal of the measurement target surface, based on the signal output by the sensor;

an image conversion unit configured to convert the image obtained due to shooting by the image capturing apparatus into an image that would be obtained were the normal of the measurement target surface coincident with the normal of the image capturing surface of the image capturing apparatus, using the calculated angle; and a vibration measurement unit configured to measure vibration of the structure, using the converted image and the measured distance.

(Supplementary Note 2)

The vibration measurement system according to supplementary note 1, in which the vibration measurement unit, when measuring the vibration, corrects vibration of the structure in a normal direction of the measurement target surface, using the measured distance and the calculated angle.

(Supplementary Note 3)

The vibration measurement system according to supplementary note 1 or 2, in which the sensor is an angular velocity sensor.

(Supplementary Note 4)

An apparatus for measuring vibration of a structure, including:

an angle calculation unit configured to calculate an angle formed by a normal of an image capturing surface of an image capturing apparatus that shoots a measurement target surface of the structure and a normal of the measurement target surface, based on a signal output by a sensor according to an inclination of the image capturing apparatus relative to a vertical direction;

an image conversion unit configured to convert the image obtained due to shooting by the image capturing apparatus into an image that would be obtained were the normal of the measurement target surface coincident with the normal of the image capturing surface of the image capturing apparatus, using the calculated angle; and a vibration measurement unit configured to measure vibration of the structure, using the converted image and a distance from the image capturing apparatus to the measurement target surface measured by a distance measuring apparatus.

(Supplementary Note 5)

The vibration measurement apparatus according to supplementary note 4, in which the vibration measurement unit, when measuring the vibration, corrects vibration of the structure in a normal direction of the measurement target surface, using the measured distance and the calculated angle.

(Supplementary Note 6)

The vibration measurement apparatus according to supplementary note 4 or 5, in which the sensor is an angular velocity sensor.

(Supplementary Note 7)

A method for measuring vibration of a structure, including:

(a) a step of shooting a measurement target surface of the structure with an image capturing apparatus;

(b) a step of measuring a distance from the image capturing apparatus to the measurement target surface with a distance measuring apparatus;

(c) a step of outputting a signal with a sensor according to an inclination of the image capturing apparatus relative to a vertical direction;

(d) a step of calculating an angle formed by a normal of an image capturing surface of the image capturing apparatus and a normal of the measurement target surface, based on the signal output by the sensor;

(e) a step of converting the image obtained due to shooting by the image capturing apparatus into an image that would be obtained were the normal of the measurement target surface coincident with the normal of the image capturing surface of the image capturing apparatus, using the calculated angle; and (f) a step of measuring vibration of the structure, using the converted image and the measured distance.

(Supplementary Note 8)

The vibration measurement method according to supplementary note 7, in which, in the (f) step, when measuring the vibration, vibration of the structure in a normal direction of the measurement target surface is corrected, using the measured distance and the calculated angle.

(Supplementary Note 9)

The vibration measurement method according to supplementary note 7 or 8, in which the sensor is an angular velocity sensor.

(Supplementary Note 10)

A computer-readable recording medium having recorded thereon a program for measuring vibration of a structure with a computer, the program including instructions that cause the computer to carry out:

(a) a step of calculating an angle formed by a normal of an image capturing surface of an image capturing apparatus that shoots a measurement target surface of the structure and a normal of the measurement target surface, based on a signal output by a sensor according to an inclination of the image capturing apparatus relative to a vertical direction;

(b) a step of converting the image obtained due to shooting by the image capturing apparatus into an image that would be obtained were the normal of the measurement target surface coincident with the normal of the image capturing surface of the image capturing apparatus, using the calculated angle; and (c) a step of measuring vibration of the structure, using the converted image and a distance from the image capturing apparatus to the measurement target surface measured by a distance measuring apparatus.

(Supplementary Note 11)

The computer-readable recording medium according to supplementary note 10, in which, in the (c) step, when measuring the vibration, vibration of the structure in a normal direction of the measurement target surface is corrected, using the measured distance and the calculated angle.

(Supplementary Note 12)

The computer-readable recording medium according to supplementary note 10 or 11, in which the sensor is an angular velocity sensor.

Although the invention of the present application has been described above with reference to an example embodiment, the invention is not limited to the foregoing example embodiment. Various modifications apparent to those skilled in the art can be made to the configurations and details of the invention of the present application within the scope of the invention.

INDUSTRIAL APPLICABILITY

As described above, according to the invention, highly accurate vibration measurement can be executed without requiring manual operations. The invention is useful in measuring the vibration of structures such as infrastructure elements.

LIST OF REFERENCE SIGNS

10 Image capturing apparatus
20 Distance measurement apparatus
30 Sensor
40 Vibration measurement apparatus
41 Angle calculation unit
42 Image conversion unit
43 Vibration measurement unit
100 Vibration measurement system
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A system for measuring vibration of a structure, comprising:
    an image capturing apparatus that shoots a measurement target surface of the structure;
    a distance measuring apparatus, including a laser element to emit laser, that measures a distance from the image capturing apparatus to the measurement target surface;
    a sensor that outputs a signal according to an inclination of the image capturing apparatus relative to a vertical direction; and
    a vibration measurement apparatus,
    the vibration measurement apparatus including:
    a memory; and
    one or more processors, using the memory, configured to:
    calculate an angle formed by a normal of an image capturing surface of the image capturing apparatus and a normal of the measurement target surface, based on the signal output by the sensor;
    convert the image obtained due to shooting by the image capturing apparatus into an image that would be obtained were the normal of the measurement target surface coincident with the normal of the image capturing surface of the image capturing apparatus, using the calculated angle; and
    calculate the displacement of the measurement target surface in a surface direction from the image converted, calculate the displacement of the measurement target surface in the normal direction from the converted image and the displacement in the surface direction, and calculate the vibration of the structure from the displacement in the surface direction and the displacement in the normal direction.

2. The vibration measurement system according to claim 1,
    wherein the one or more processors are further configured to: when calculating the vibration, correct vibration of the structure in a normal direction of the measurement target surface, using the measured distance and the calculated angle.

3. The vibration measurement system according to claim 1,
    wherein the sensor is an angular velocity sensor.

4. An apparatus for measuring vibration of a structure, comprising:
    a memory; and
    one or more processors, using the memory, configured to:
    calculate an angle formed by a normal of an image capturing surface of an image capturing apparatus for shooting a measurement target surface of the structure and a normal of the measurement target surface, based on a signal output by a sensor according to an inclination of the image capturing apparatus relative to a vertical direction;
    convert the image obtained due to shooting by the image capturing apparatus into an image that would be obtained were the normal of the measurement target surface coincident with the normal of the image capturing surface of the image capturing apparatus, using the calculated angle; and
    calculate the displacement of the measurement target surface in a surface direction from the image converted, calculate the displacement of the measurement target surface in the normal direction from the converted image and the displacement in the surface direction, and calculate the vibration of the structure from the displacement in the surface direction and the displacement in the normal direction.

5. The vibration measurement apparatus according to claim 4,
    wherein the one or more processors are further configured to: when calculating the vibration, correct vibration of the structure in a normal direction of the measurement target surface, using the distance measured by a distance measuring apparatus including a laser element to emit laser and the calculated angle.

6. The vibration measurement apparatus according to claim 4,
    wherein the sensor is an angular velocity sensor.

7. A method for measuring vibration of a structure, comprising:
    shooting a measurement target surface of the structure with an image capturing apparatus;
    measuring a distance from the image capturing apparatus to the measurement target surface with a distance measuring apparatus;
    outputting a signal with a sensor according to an inclination of the image capturing apparatus relative to a vertical direction;
    calculating an angle formed by a normal of an image capturing surface of the image capturing apparatus and a normal of the measurement target surface, based on the signal output by the sensor;

converting the image obtained due to shooting by the image capturing apparatus into an image that would be obtained were the normal of the measurement target surface coincident with the normal of the image capturing surface of the image capturing apparatus, using the calculated angle; and calculating the displacement of the measurement target surface in a surface direction from the image converted, calculating the displacement of the measurement target surface in the normal direction from the converted image and the displacement in the surface direction, and calculating the vibration of the structure from the displacement in the surface direction and the displacement in the normal direction.

8. The vibration measurement method according to claim 7, wherein, when calculating the vibration, vibration of the structure in a normal direction of the measurement target surface is corrected, using the measured distance and the calculated angle.

9. The vibration measurement method according to claim 7, wherein the sensor is an angular velocity sensor.

10. A non-transitory computer-readable recording medium that includes a program recorded thereon for measuring vibration of a structure with a computer, the program including instructions that cause the computer to carry out:

calculating an angle formed by a normal of an image capturing surface of an image capturing apparatus for shooting a measurement target surface of the structure and a normal of the measurement target surface, based on a signal output by a sensor according to an inclination of the image capturing apparatus relative to a vertical direction;

converting the image obtained due to shooting by the image capturing apparatus into an image that would be obtained were the normal of the measurement target surface coincident with the normal of the image capturing surface of the image capturing apparatus, using the calculated angle; and calculating the displacement of the measurement target surface in a surface direction from the image converted, calculating the displacement of the measurement target surface in the normal direction from the converted image and the displacement in the surface direction, and calculating the vibration of the structure from the displacement in the surface direction and the displacement in the normal direction.

11. The non-transitory computer-readable recording medium according to claim 10, wherein, when calculating the vibration, vibration of the structure in a normal direction of the measurement target surface is corrected, using the distance measured by a distance measuring apparatus and the calculated angle.

12. The non-transitory computer-readable recording medium according to claim 10, wherein the sensor is an angular velocity sensor.

\* \* \* \* \*